US012409576B2

(12) United States Patent
Bucks

(10) Patent No.: US 12,409,576 B2
(45) Date of Patent: Sep. 9, 2025

(54) KNIFE ASSEMBLY AND CUTTING SYSTEM EQUIPPED WITH SAME

(71) Applicant: FAM, Kontich (BE)

(72) Inventor: Brent L. Bucks, Kontich (BE)

(73) Assignee: FAM, Kontich (BE)

( * ) Notice: Subject to any disclaimer, the term of this patent is extended or adjusted under 35 U.S.C. 154(b) by 0 days.

(21) Appl. No.: 18/451,139

(22) Filed: Aug. 17, 2023

(65) Prior Publication Data

US 2023/0390956 A1 Dec. 7, 2023

Related U.S. Application Data

(62) Division of application No. 16/970,640, filed as application No. PCT/EP2019/054105 on Feb. 19, 2019, now Pat. No. 11,772,293.

(30) Foreign Application Priority Data

Feb. 20, 2018 (EP) .................................... 18157572

(51) Int. Cl.
*B26D 7/06* (2006.01)
*B26D 1/00* (2006.01)
*B26D 1/03* (2006.01)
*B26D 7/26* (2006.01)

(52) U.S. Cl.
CPC ............. *B26D 7/0691* (2013.01); *B26D 1/03* (2013.01); *B26D 7/2614* (2013.01); *B26D 2001/006* (2013.01)

(58) Field of Classification Search
CPC .......... B26D 7/06; B26D 7/0691; B26D 7/26; B26D 7/2607; B26D 7/2614
USPC .................................................... 83/402–408
See application file for complete search history.

(56) References Cited

U.S. PATENT DOCUMENTS 3,981,337 A 9/1976 Sundstrom
4,511,586 A * 4/1985 Fitzwater ................ A23L 19/13
426/550
4,523,503 A 6/1985 Julian
4,590,835 A 5/1986 Matsuo
(Continued)

FOREIGN PATENT DOCUMENTS

EP 1584429 A1 10/2005
WO 2013163209 A1 10/2013
(Continued)

*Primary Examiner* — Adam J Eiseman
*Assistant Examiner* — Richard D Crosby, Jr.
(74) *Attorney, Agent, or Firm* — Ipsilon USA—NLO

(57) ABSTRACT

A knife assembly includes a knife blade of which a front edge is a cutting edge, a holder for supporting the knife blade, a clamp for clamping the knife blade onto the holder, and a fastening mechanism for securing and clamping the knife blade between the clamp and the holder with the cutting edge protruding at a front side of the assembly. The holder has a frontal portion which is the foremost portion of the assembly at a bottom side of the knife blade and of which a foremost contact point is, in clamped state, in contact with a bottom side of the knife blade at a first distance from the cutting edge. The clamp includes front portions which protrude forward and into valleys of the knife blade and which have leading edges that protrude beyond said foremost contact point and create a crumple zone in front of the holder.

20 Claims, 12 Drawing Sheets

(56) References Cited

U.S. PATENT DOCUMENTS

| | | | | |
|---|---|---|---|---|
| 4,794,961 | A | 1/1989 | Bonac | |
| 4,937,084 | A * | 6/1990 | Julian | B26D 1/03 426/144 |
| 4,945,794 | A | 8/1990 | Quo | |
| 5,095,875 | A | 3/1992 | Morris | |
| 5,211,097 | A | 5/1993 | Grasselli | |
| 5,494,478 | A | 2/1996 | Long | |
| 5,555,787 | A * | 9/1996 | Barber | B26D 7/2614 83/404.3 |
| 5,819,628 | A | 10/1998 | Cogan et al. | |
| 6,299,523 | B1 | 10/2001 | Wonderlich | |
| 6,458,025 | B1 | 10/2002 | Hamblin | |
| 6,561,885 | B1 | 5/2003 | Loth | |
| 6,589,108 | B2 | 7/2003 | Townsend | |
| 6,591,878 | B2 | 7/2003 | Hinchliff | |
| 6,662,837 | B2 | 12/2003 | Smith | |
| 6,968,765 | B2 * | 11/2005 | King | B26D 7/2614 83/403 |
| 7,069,969 | B2 | 7/2006 | Knappett | |
| 7,134,622 | B2 | 11/2006 | Biller | |
| 7,159,626 | B2 | 1/2007 | Biller | |
| 7,178,440 | B2 | 2/2007 | Bucks | |
| 7,836,923 | B2 | 11/2010 | Stager | |
| 7,891,388 | B2 | 2/2011 | Hinchliff | |
| 8,033,308 | B2 | 10/2011 | Stager | |
| 8,161,856 | B2 | 4/2012 | Jacko | |
| 8,714,068 | B2 | 5/2014 | Ornelaz, Jr. | |
| 9,462,818 | B2 * | 10/2016 | Barber | A23L 19/09 |
| 9,469,041 | B2 | 10/2016 | King | |
| 9,517,572 | B2 | 12/2016 | Michel | |
| 9,840,015 | B2 | 12/2017 | King | |
| 9,849,600 | B2 | 12/2017 | King | |
| 10,611,042 | B2 | 4/2020 | McCracken | |
| 10,632,640 | B2 | 4/2020 | Bucks | |
| 10,919,172 | B2 | 2/2021 | Bucks | |
| 10,919,173 | B2 | 2/2021 | Bucks | |
| 11,027,450 | B2 | 6/2021 | Gereg | |
| 11,034,043 | B2 * | 6/2021 | Baxter | B26D 1/03 |
| 2003/0145698 | A1 | 8/2003 | Bucks | |
| 2007/0240550 | A1 | 10/2007 | Jacko | |
| 2010/0206185 | A1 | 8/2010 | Bucks | |
| 2013/0276604 | A1 | 10/2013 | King | |
| 2014/0007751 | A1 | 1/2014 | Michel | |
| 2014/0260850 | A1 | 9/2014 | Reis | |
| 2015/0107426 | A1 | 4/2015 | King | |
| 2017/0087735 | A1 * | 3/2017 | King | B26D 7/2614 |
| 2018/0071934 | A1 | 3/2018 | King | |
| 2020/0223084 | A1 | 7/2020 | Baxter | |
| 2021/0162620 | A1 | 6/2021 | Bucks | |

FOREIGN PATENT DOCUMENTS

| | | | |
|---|---|---|---|
| WO | 2015075179 | A1 | 5/2015 |
| WO | 2015089162 | A1 | 6/2015 |

* cited by examiner

KNIFE ASSEMBLY AND CUTTING SYSTEM EQUIPPED WITH SAME

FIELD OF THE INVENTION

The present invention relates to a knife assembly for a cutting apparatus and further to a cutting apparatus or a part thereof such as a cutting head or system equipped with such a knife assembly for cutting food products and use thereof.

BACKGROUND ART

From US 2007/0240550 A1, a cutting apparatus is known which comprises an annular-shaped cutting head and an impeller coaxially mounted for rotation within the cutting head to deliver food products radially outward toward the cutting head. The cutting head has a plurality of cutting stations where knives extend radially inward toward the impeller. The knives are held by knife assemblies which each comprise: a holder ("inner holder 74") configured for supporting the knife blade, a clamp ("outer holder 76") arranged for clamping the knife blade onto the holder, and a fastening mechanism cooperating with the clamp and the holder for securing and clamping the knife blade between the clamp and the holder with the cutting edge protruding at a front side of the knife assembly.

The holder has a separate, replaceable frontal part ("insert 80") which is, in clamped state, in contact with a bottom side of the knife blade at a first distance from the cutting edge. The replaceable frontal part or insert serves to protect the edge of the (inner) holder from stones or other debris that are often unintentionally fed through the impeller along with food products. In case of stones or debris, one only has to replace the damaged insert instead of having to replace the complete holder.

From U.S. Pat. No. 7,178,440 B2, a cutting apparatus is known which comprises a cutting wheel, wherein knife assemblies are arranged as spokes of the cutting wheel. The knife assemblies likewise each comprise a knife holder with an insert to protect the edge of the holder from stones or other debris.

The replaceable insert is however an additional part which has to be ordered, stocked etc. Furthermore, manufacturing tolerances may lead to inaccurate positioning of the cutting edge.

SUMMARY OF THE INVENTION

It is an aim of the present invention to provide a knife assembly which provides protection for the holder against stones or debris in another way.

It is a second aim of the present invention to provide a knife assembly with improved clamping of the knife blade.

It is a third aim of the present invention to provide a knife assembly wherein the replacement of the knife blade takes less time.

The invention provides, according to a first aspect, a knife assembly comprising a knife blade of which a front edge is a cutting edge, a holder configured for supporting the knife blade, a clamp arranged for clamping the knife blade onto the holder, and a fastening mechanism cooperating with the clamp and the holder for securing and clamping the knife blade between the clamp and the holder with the cutting edge protruding at a front side of the knife assembly. The holder has a frontal part which is, in clamped state, in contact with a bottom side of the knife blade at a first distance from the cutting edge. The clamp has a frontal tip which, in clamped state, clamps onto a top side of the knife blade and is located a second distance from the cutting edge, the second distance being smaller than the first distance.

The invention provides, according to a second aspect, a knife assembly comprising a knife blade of which a front edge is a cutting edge, a holder configured for supporting the knife blade, a clamp arranged for clamping the knife blade onto the holder, and a fastening mechanism cooperating with the clamp and the holder for securing and clamping the knife blade between the clamp and the holder with the cutting edge protruding at a front side of the knife assembly. The holder has a frontal part which is, in clamped state, in contact with a bottom side of the knife blade at a location which is spaced a first distance from the cutting edge. The clamp has at least one clamping part of which a frontal tip, in clamped state, clamps onto a top side of the knife blade at a location which is spaced a second distance from the cutting edge, the second distance being smaller than the first distance.

In other words, contrary to knife assemblies known from the prior art, the frontal tip of the clamp according to the invention is closer to the cutting edge than the frontal part of the holder.

In particular, contrary to knife assemblies known from the prior art, the frontal tip of the clamp according to the invention contacts the knife blade along a clamping line which is located between the cutting edge and the (foremost) contact line where the frontal part of the holder contacts the knife blade.

Generally, although not necessarily, the "holder" is the part of a knife assembly which faces the side from which the product to be cut is fed and the "clamp" is facing the side to which cut product is discharged. Generally, although not necessarily, the holder is a larger and thus more expensive part than the clamp. Generally, although not necessarily, the holder comprises mounting portions for mounting the knife assembly on the cutting apparatus (e.g. a cutting head or a cutting wheel) and comprises a support surface for supporting the knife blade. Generally, although not necessarily, the clamp is a part designed to be pushed onto the holder by the fastening mechanism and to flex to a certain extent upon clamping the knife blade.

The inventors have found that by extending the length of the clamp such that its frontal tip or leading edge protrudes beyond the leading edge or frontal part of the holder, a crumple zone is created in front of the holder. This crumple zone is made up of both the knife blade and the clamp and provides resistance to stone penetration in front of the holder. Tests have shown that this can reduce or eliminate damage on the holder. Consequently, since the holder is generally a more expensive part than the clamp, operating costs can be reduced.

The inventors have further found that by extending the length of the clamp such that its frontal tip or leading edge protrudes with respect to the leading edge or frontal part of the holder, the cross-sectional thickness of the clamp along the leading edge or frontal part of the holder can be increased. This increased cross-sectional thickness can result in a stronger holding force on the knife blade. Furthermore, the contact surface area between the knife blade and the clamp can also be increased. The protruding area of the knife clamp past the holder can also provide more precise locating support to the knife blade very near the cutting edge. Tests have shown that this precise support can reduce or eliminate the flex of the knife blade and the risk of a resulting gap underneath the knife blade, i.e. between the knife blade and the holder, where small particles like dirt, sand or starch could enter. In absence of such a gap, particles cannot enter between the knife blade and the holder, and it can thus be ensured that the knife blade stays in place over an entire production run.

The inventors have further found that by extending the length of the clamp such that its frontal tip or leading edge protrudes with respect to the leading edge or frontal part of the holder, the knife blade exposure distance, i.e. the distance that the knife blade protrudes from the holder, can be increased.

The inventors have further found that by extending the length of the clamp such that its frontal tip or leading edge protrudes beyond the leading edge or frontal part of the holder, the knife blade can be removed or replaced without removing the clamp. Because the clamp extends past the holder it is possible to loosen the fastening mechanism and lift the clamp to remove a knife blade and install a new knife blade while the clamp remains in place. This avoids the need to remove the clamp from the holder and can thus reduce knife blade changing time.

In embodiments according to the invention, the clamp may be provided for, in clamped state, clamping the knife blade by means of the frontal tip along a first clamping line and by means of a second clamping portion along at least a second clamping line a predetermined distance rearward from the first clamping line. The second clamping line is preferably located rearward from the (foremost) location of contact between the frontal part of the holder and the bottom side of the knife blade. It has been found that by providing this second clamping portion, especially if located rearward from the frontal part of the holder, the clamping action can be enhanced as a result of a stronger and/or more distributed clamping force.

In embodiments according to the invention, the holder and clamp may have complementary shaped surfaces such that in clamped state both the holder and the clamp have a surface contact with the knife blade. It has been found that by providing such complementary surfaces which contact and clamp the knife blade in between them, the clamping action can be enhanced as a result of a stronger and/or more distributed clamping force.

In embodiments according to the invention, the included angle between the top surface of the clamp and the top surface of the knife blade may be in the range of 6 to 12°. It has been found that by extending the clamp, such that its leading edge or frontal tip is moved forward on the knife assembly, the included angle between the top surface of the clamp and the knife blade can be reduced. This can in turn lead to a reduced "rake-off angle". The rake-off angle is defined as the angle that a product slice deviates upon being cut by the knife blade and being pushed outwards by the clamp. This angle is measured relative to a tangent line to the preceding product sliding surface (leading up to the knife assembly) For example, in an annular-shaped cutting head, the rake-off angle is measured relative to the product sliding surface at the trailing end of the respective preceding cutting station or wall segment.

In embodiments according to the invention, the cutting edge may protrude 3.0 to 8.0 mm, preferably 3.0 to 5.0 mm, in front of the leading edge/frontal part of the holder; while the frontal tip of the clamp protrudes 0.1 to 7.5 mm, preferably 0.1 to 4.5 mm, in front of the leading edge/frontal part of the holder.

In embodiments according to the invention, the distance between the first clamping line and the second clamping line, and/or the length of the clamping surface, may be at least 2.0 mm, preferably in the range of 8.0 to 14.0 mm, more preferably 11.0 to 13.0 mm.

In embodiments according to the invention, the knife blade may be a corrugated knife blade, wherein the holder is provided with a bearing surface complementary to the bottom side of the knife blade and the clamp comprises fingers complementary to the top side of the knife blade.

In embodiments according to the invention, the knife blade may be a flat or planar knife blade, wherein the holder may be provided with a curved, preferably concave bearing surface and the clamp may be configured for in clamped state bending the knife blade onto the curved bearing surface, thereby tensioning the knife blade and straightening the cutting edge. To this end, the clamp may be shaped for bending the knife blade upon being fastened, for example comprise a curved, preferably convex clamping surface. The bearing surface and the clamping surface are preferably complementary surfaces, such that in clamped state both make a surface contact with the knife blade.

In embodiments according to the invention, the holder may be a wall segment of an annular-shaped cutting head, for example be provided for being assembled onto at least one rim structure of such a cutting head.

In embodiments according to the invention, the holder may be a spoke-like part of a cutting wheel, for example be provided for being assembled between a hub and a rim of such a cutting wheel.

In a further aspects, which may be combined with the other aspects and embodiments described herein, the invention provides cutting apparatuses or components thereof comprising at least one knife assembly as described herein. For example: an annular-shaped cutting head comprising at least one rim structure and a plurality of knife assemblies as described herein assembled onto said at least one rim structure; a centrifugal cutting apparatus comprising such a cutting head; a cutting wheel comprising a hub, a rim and a plurality of knife assemblies as described herein assembled between said hub and said rim; and a cutting apparatus comprising such a cutting wheel.

BRIEF DESCRIPTION OF THE DRAWINGS

The present invention will be discussed in more detail below, with reference to the attached drawings.

DESCRIPTION OF EMBODIMENTS

Figure 1:
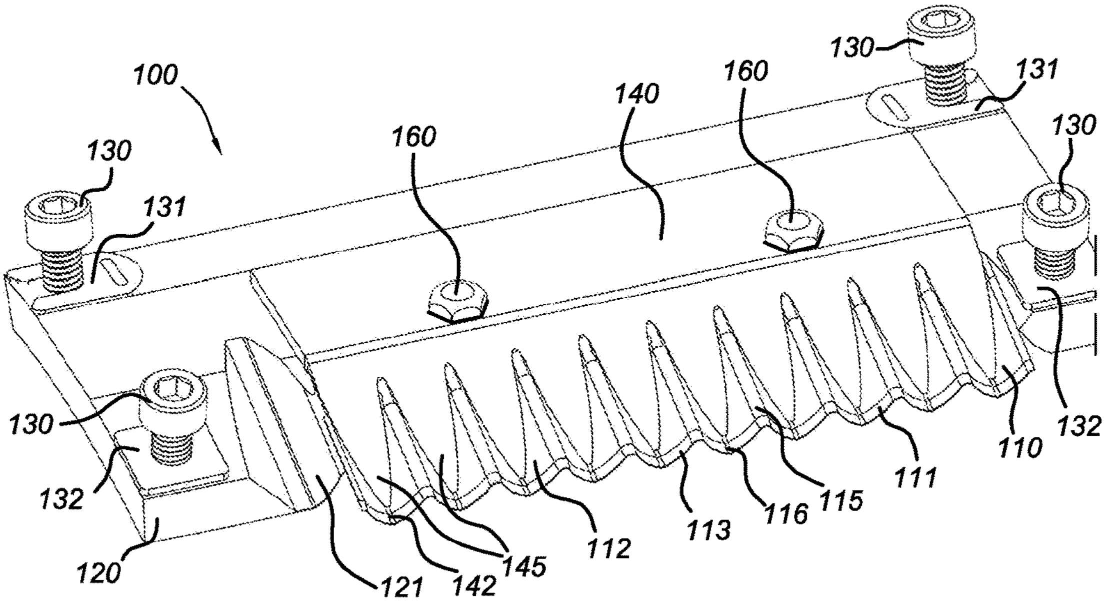
FIG. 1 shows a perspective view of a first embodiment of a knife assembly according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

A first embodiment of a knife assembly according to the invention will be described with reference to FIGS. 1-11. The knife assembly 100 is for an annular-shaped cutting head, shown in FIGS. 9-11. Cutting apparatuses of this type, comprising a cutting head and an impeller have been described a.o. in the following documents, which are incorporated herein by reference: WO 2012/139988 A1, "Apparatus and method for cutting products"; WO 2012/139991 A1, "Apparatus and method for cutting products"; WO 2013/045684 A1, "Cutting head assembly for centrifugal cutting apparatus and centrifugal apparatus equipped with same"; WO 2013/045685 A1, "Impeller for centrifugal food cutting apparatus and centrifugal food cutting apparatus comprising same"; EP 2918384 A1, "Cutting head assembly for a centrifugal cutting apparatus and centrifugal apparatus equipped with same"; WO 2015/075180 A1, "Knife assembly for corrugated knife blade and cutting system equipped with same"; WO 2015/075179 A1, "Knife assembly for flat knife blade and cutting system equipped with same".

The knife assembly 100 is provided for mounting a corrugated knife blade 110 with peaks 115 and valleys 116. The knife assembly 100 comprises a holder 120, which is in this embodiment a wall segment for the cutting head. The holder 120 has a bearing surface 121 which is configured for supporting the knife blade 110. The holder 120 and/or the clamp 140 are provided for defining the position of the knife blade 110 on the holder by means of a stop part which engages the back edge 114 of the knife blade 110. In the embodiment shown, this is provided by the bearing surface 121 having holes 124 for receiving stop elements (not shown) which hold the back edge 144 of the knife blade.

The knife assembly 100 further comprises a clamp 140 which is arranged for clamping the knife blade 110 onto the holder 120, and a fastening mechanism 160, in this embodiment a pair of fastening screws 160, cooperating with the clamp and the holder for securing and clamping the knife blade 110 between the clamp 140 and the holder 120, referred to herein as the "clamped state". When assembled, the cutting edge 111 of the knife blade 110 protrudes at a front side of the knife assembly 100. The holder has a frontal part 122 which is, in clamped state, in contact with a bottom side 113 of the knife blade at a first distance D1 from the cutting edge, for example 3.0 to 8.0 mm. The clamp 140 has a frontal tip 142, in this embodiment the tips of a plurality of clamping fingers 145, which, in clamped state, clamps onto a top side 112 of the knife blade and is located a second distance D2 from the cutting edge 111, the second distance D2 being smaller than the first distance D1 (see FIG. 7), for example 0.1 to 7.5 mm. Preferably D1 is 3.0 to 5.0 mm and D2 is 0.1 to 4.5 mm.

Figure 2:
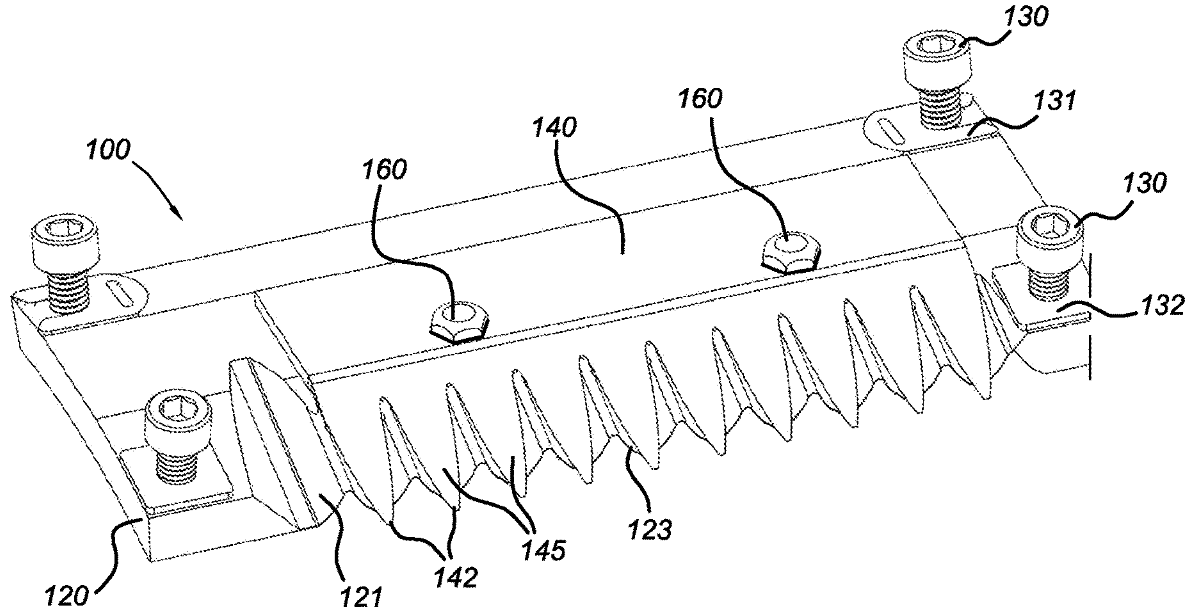
FIG. 2 shows the knife assembly of FIG. 1 with the knife blade removed.
Figure 3:
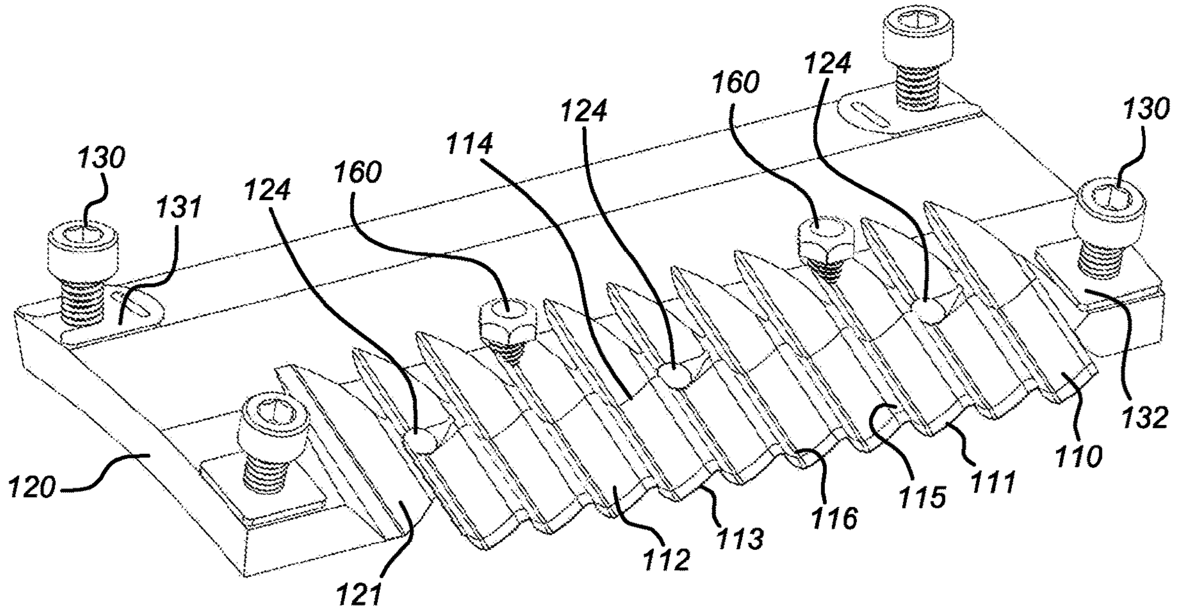
FIG. 3 shows the knife assembly of FIG. 1 with the clamp removed.
Figure 4:
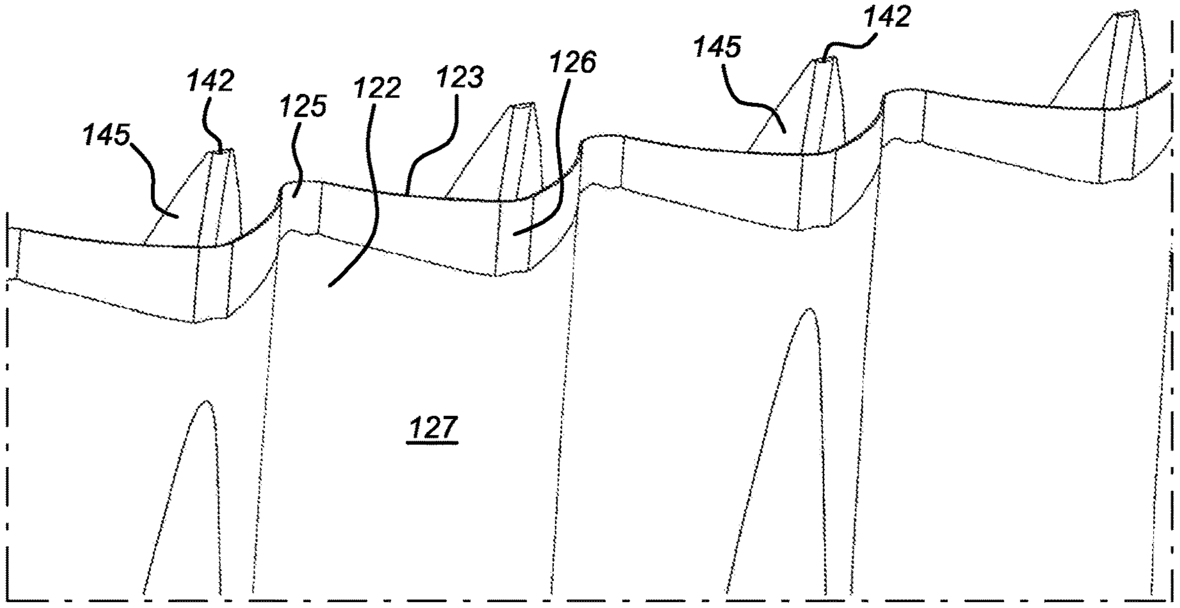
FIG. 4 shows a detail of the knife assembly of FIG. 1.
Figure 5:
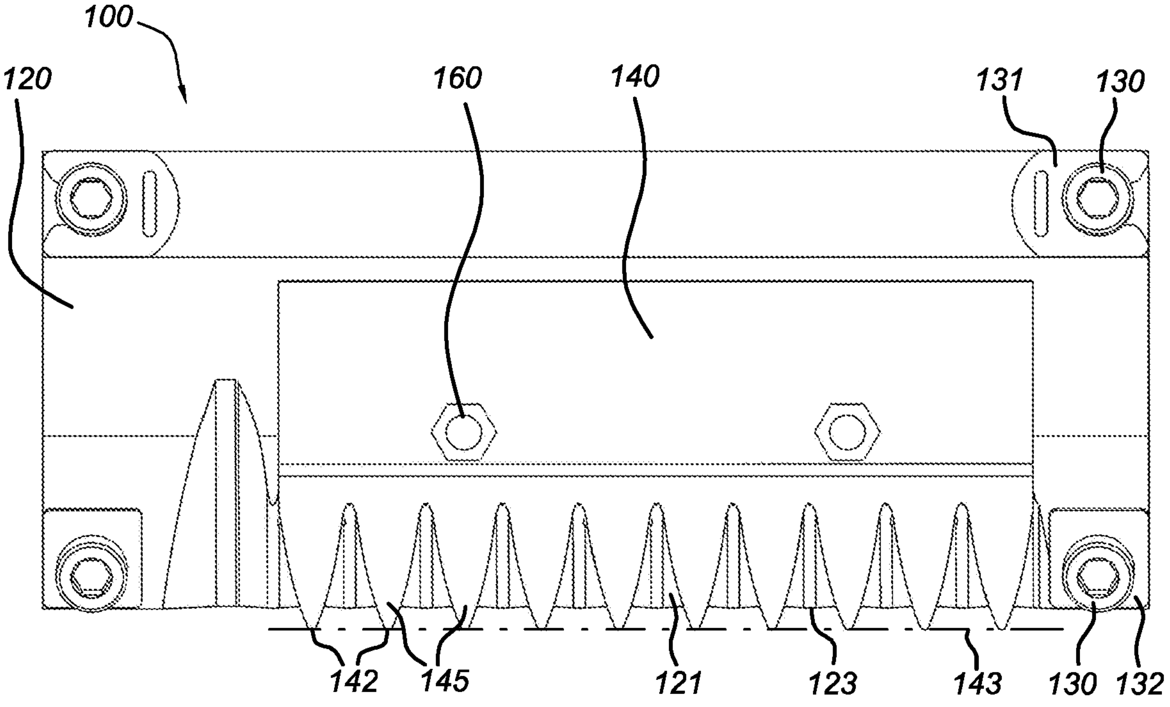
FIG. 5 shows a top view of the knife assembly of FIG. 1 with the knife blade removed.
Figure 6:
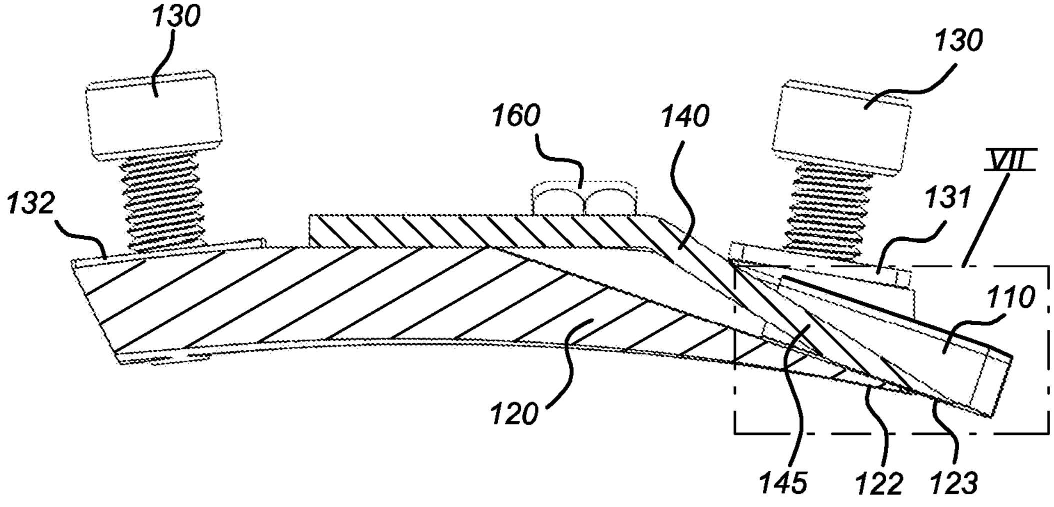
FIG. 6 shows a cross-sectional view of the knife assembly of FIG. 1.
Figure 7:
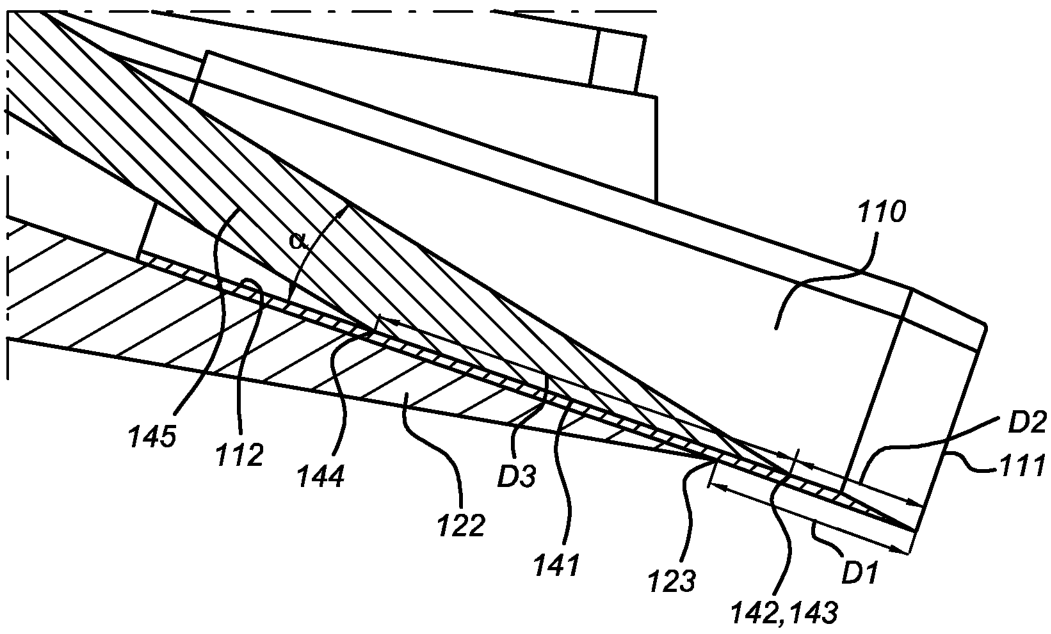
FIG. 7 shows a detail of FIG. 6.
Figure 8:
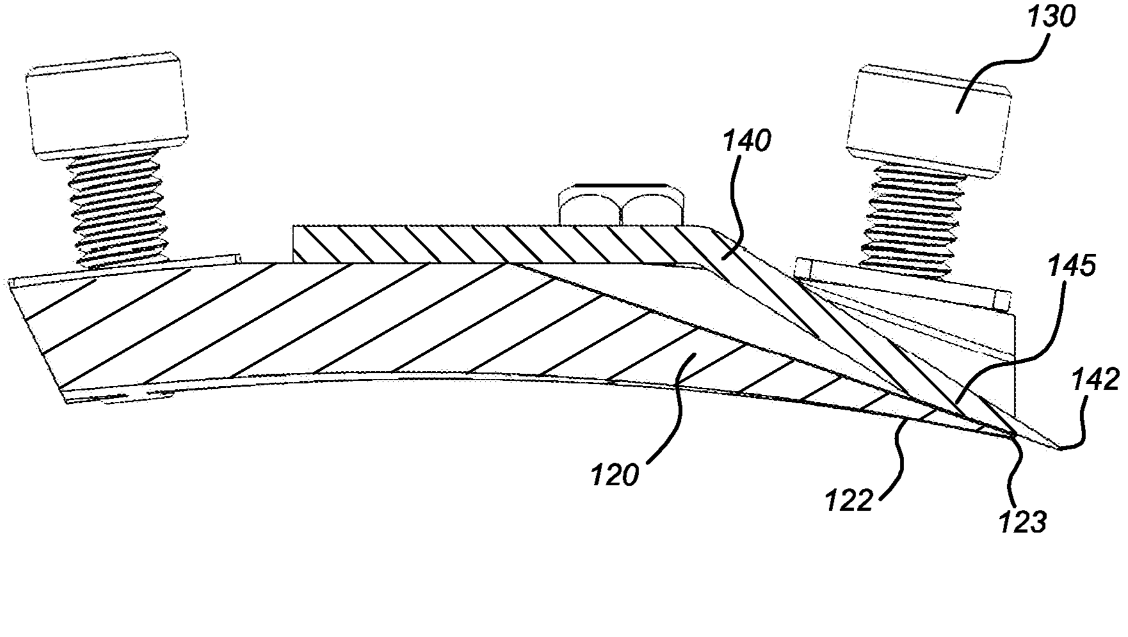
FIG. 8 shows a cross-sectional view of the knife assembly of FIG. 1 with the knife blade removed.

This is clearly shown in FIGS. 2 and 8, where the knife blade 110 has been removed from between the holder 120 and the clamp 140. The tips of the fingers 145 protrude from the front edge 123 of the holder 120, so with the knife blade present as in FIG. 1 the frontal tips 142 of the clamp are closer to the cutting edge 111 than the front edge 123 of the holder 120.

The frontal tips 142 of the fingers 145 of the clamp 140 contact the knife blade 110 along a first clamping line 143, which is located at the distance D1 from the cutting edge 111. As a result, this first clamping line 143 is generally located between the cutting edge 111 and the (foremost) contact point or line 123 (in this embodiment the front edge) where the frontal part 122 of the holder 120 contacts the knife blade 111.

The holder 120 is the part of the knife assembly which in use faces the inside of the cutting head, i.e. the side from which the product to be cut is fed by means of an impeller (not shown), and the clamp 140 is in use facing the outside of the cutting head, i.e. the side to which cut product is discharged. The holder 120 is a larger and thus generally more expensive part than the clamp 140, which is generally thinner and may be designed to flex to a certain extent upon clamping the knife blade. The holder 120 comprises mounting portions with fixing bolts 130 for mounting the knife assembly 100 to rim structures 133, thereby forming the cutting head. As shown in the figures, gap setting elements 131 are placed at the rear or trailing end of the holder 120 to adjust the position of the trailing end with respect to the rim structure 133, which adjusts the gap or gate opening at the subsequent knife blade and sets the slice thickness. At the leading end of the holder 120, similar elements 132 may be placed or permanently fixed to compensate for manufacturing tolerances. This gap setting system has been described in detail in applicant's co-pending European patent application EP 2 918 384 A1, which is incorporated herein by reference in its entirety.

Extending the length of the fingers 145 of the clamp 140 such that the frontal tips protrude beyond the leading edge or frontal part 122 of the holder 120 has several advantages. Firstly, a crumple zone is created in front of the holder 120. This crumple zone is made up of both the knife blade 110 and the clamp 140 and provides resistance to stone penetration in front of the holder 120. Tests have shown that this can reduce or eliminate damage on the holder.

Further, the cross-sectional thickness of the clamp 140 along the frontal part 122, or at least the leading edge 123 of the holder 120 can be increased. This increased cross-sectional thickness means that there is more material opposite the frontal part 122 or leading edge 123, which can result in a stronger holding force on the knife blade 110. Furthermore, the contact surface area between the knife blade 110 and the clamp 140 can also be increased, i.e. the knife blade 110 can be held between larger areas. The protruding parts of the knife clamp 140 past the holder 120 can also provide more precise locating support to the knife blade very near the cutting edge. Tests have shown that this precise support can reduce or eliminate the flex of the knife blade 110 and the risk of a resulting gap underneath the knife blade, i.e. between the knife blade 110 and the holder 120, where small particles like dirt, sand or starch could enter. In absence of such a gap, particles cannot enter between the knife blade and the holder, and it can thus be ensured that the knife blade stays in place over an entire production run.

Still further, the extended clamp 140 can facilitate the replacement of the knife blades 110 on the assembled cutting head. In particular, the knife blades 110 can be removed or replaced without having to completely remove the clamps. Because the clamp 140 extends past the holder 120 it is possible to loosen the fastening mechanism 160 and lift the clamp 140 to remove a knife blade and install a new knife blade while the clamp remains in place, by sliding in the new knife blade from the inside of the cutting head (see FIGS. 9-11). This can thus reduce knife blade changing time.

In the embodiment shown, the clamp 140 clamps the knife blade 110 by means of the frontal tips 142 along the first clamping line 143 and by means of a clamping surface 141 which extends rearward from the first clamping line 143 up to a second clamping line 144, which is a predetermined distance D3 rearward from the first clamping line (see FIG. 7), for example at least 2.0 mm, preferably 8.0 to 14.0 mm, more preferably 11.0 to 13.0 mm. In other words, the clamping lines 143 and 144 are boundaries of a clamping surface 141 which is fully in contact with the knife blade 110 in clamped state. The second clamping line 144 is preferably located rearward from the frontal edge 123, i.e. the foremost location of contact between the frontal part 122 of the holder and the bottom side 113 of the knife blade 110. This provides a large clamping area, as a result whereof clamping action can be enhanced due to a stronger and/or more distributed clamping force.

In alternative embodiments, the clamp 140 may contact the knife blade 110 only at the frontal tip 142 in clamped state, or at the frontal tip 142 and one or more second clamping portions rearward and spaced from the frontal tip 142, for example along a second clamping line 144. In other words, it is not essential that the clamp 140 touches on the knife blade 110 with a full clamping surface 141.

In the embodiment shown, the holder 120 and clamp 140 have complementary shaped surfaces, namely bearing surface 121 and clamping surface 141, such that in clamped state both the holder and the clamp have a surface contact with the knife blade. In particular, the bottom sides of the clamping fingers 145 (which together form the clamping surface 141) are complementary to the valleys 116 of the corrugated knife blade 110 and the bearing surface 121 has peaks 125 and valleys 126 corresponding to the peaks 115 and valleys 116 of the knife blade 110.

Figure 9:
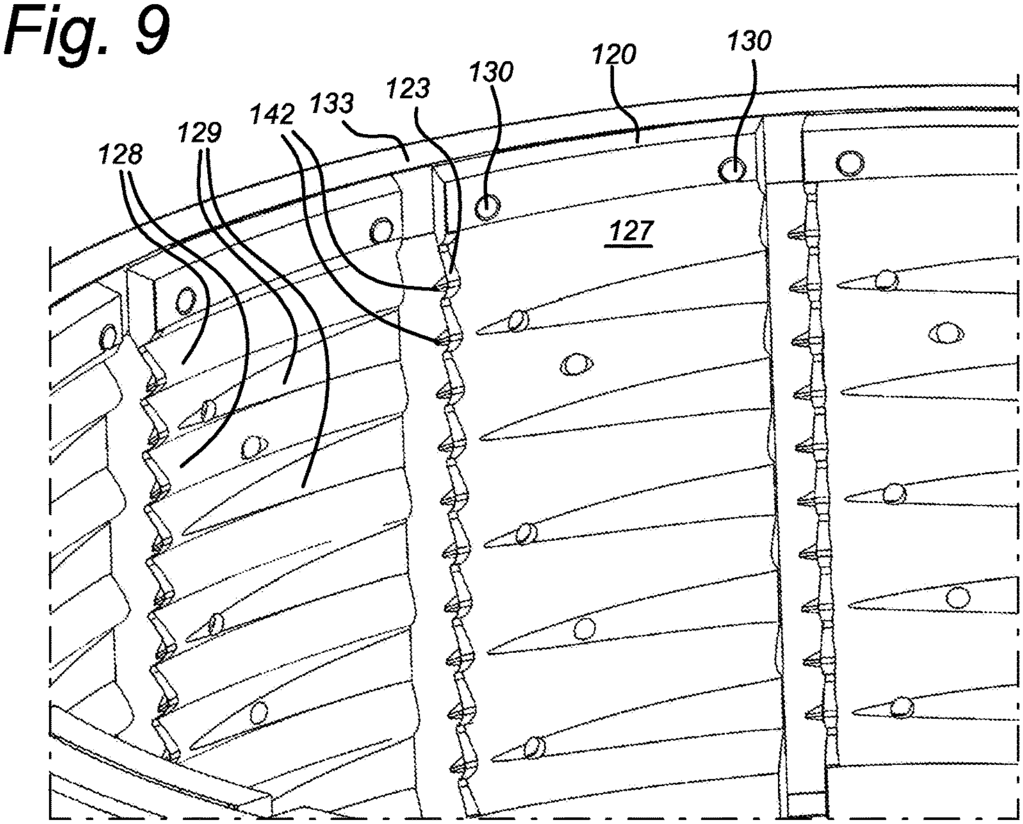
FIGS. 9 and 10 show perspective views of a cutting head comprising a plurality of knife assemblies according to FIG. 1, with the knife blades removed.
Figure 10:
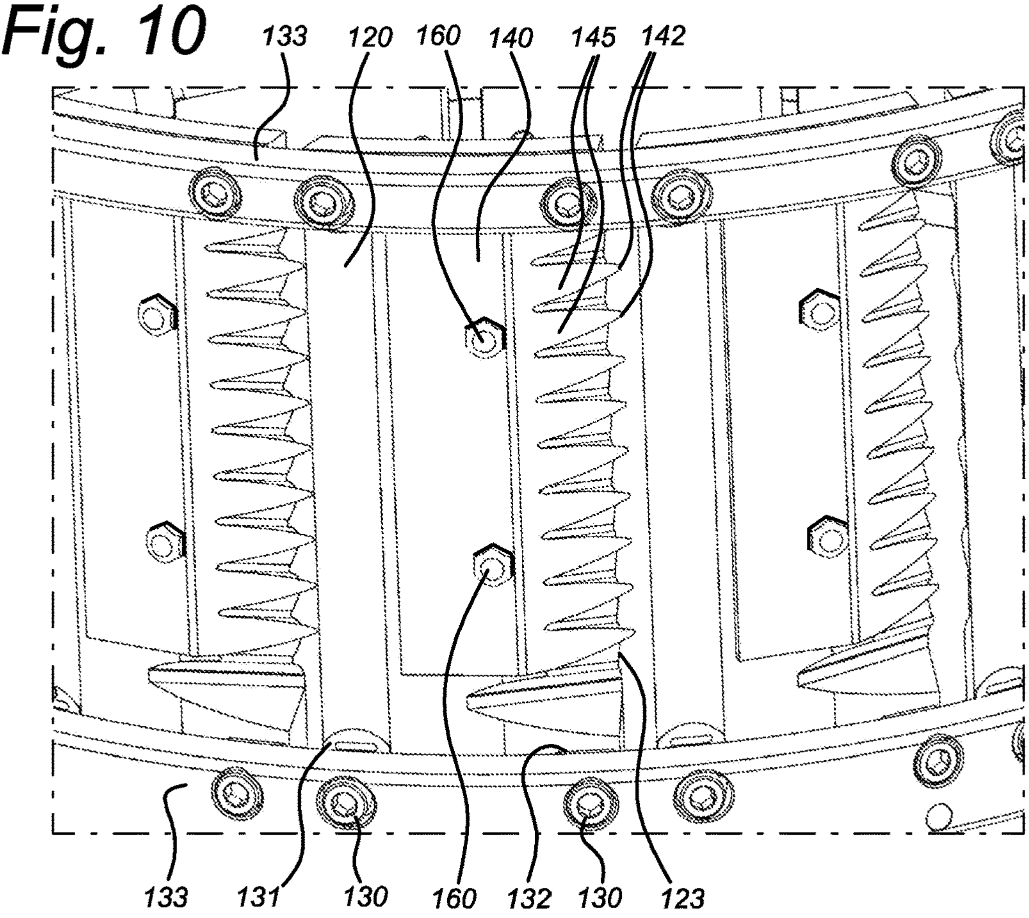
Figure 11:
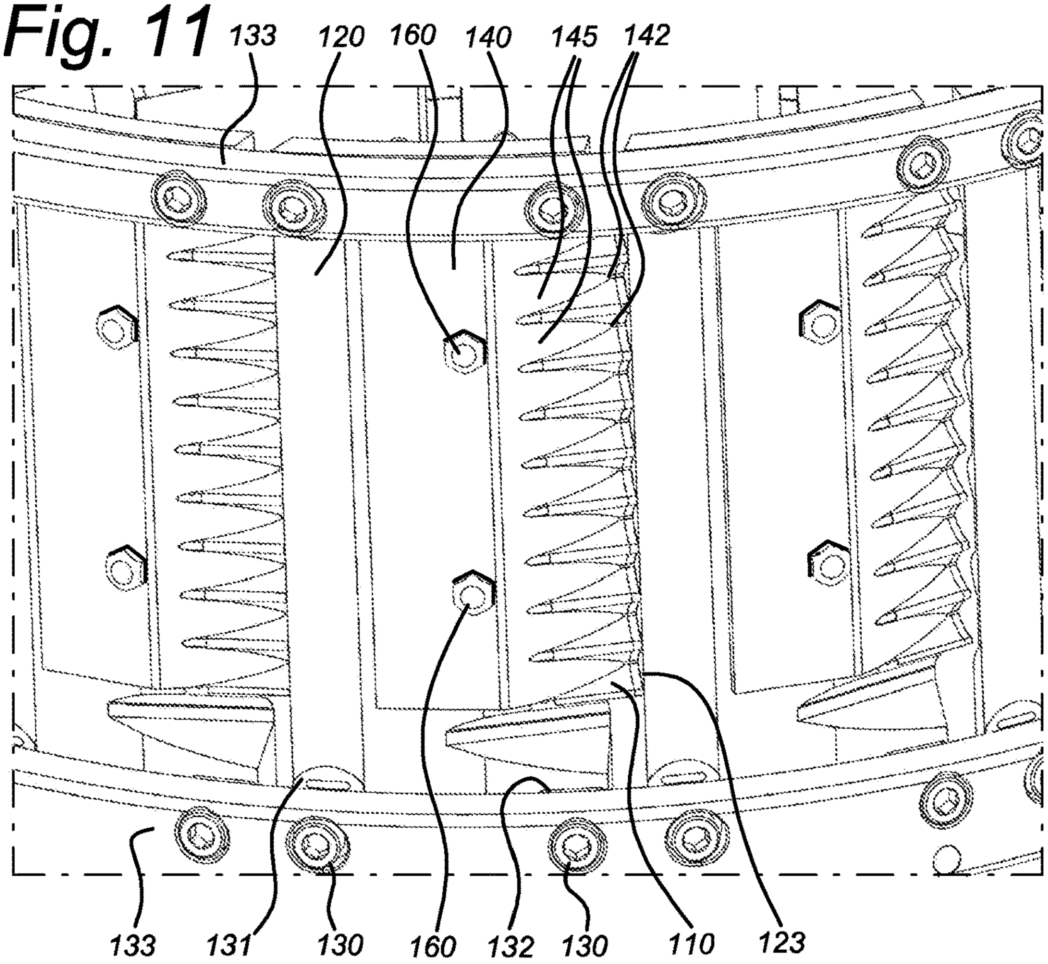
FIG. 11 shows a perspective view of the cutting head of FIGS. 9-10 with the knife blades installed.
Figure 12:
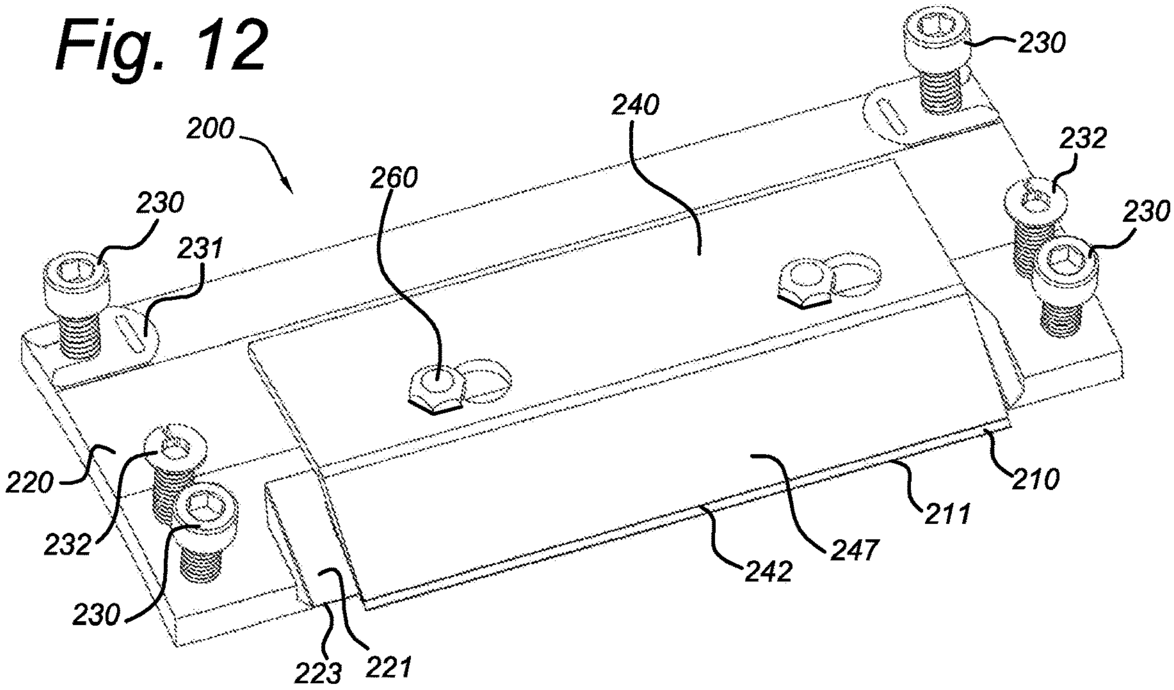
FIG. 12 shows a perspective view of a second embodiment of a knife assembly according to the invention.
Figure 13:
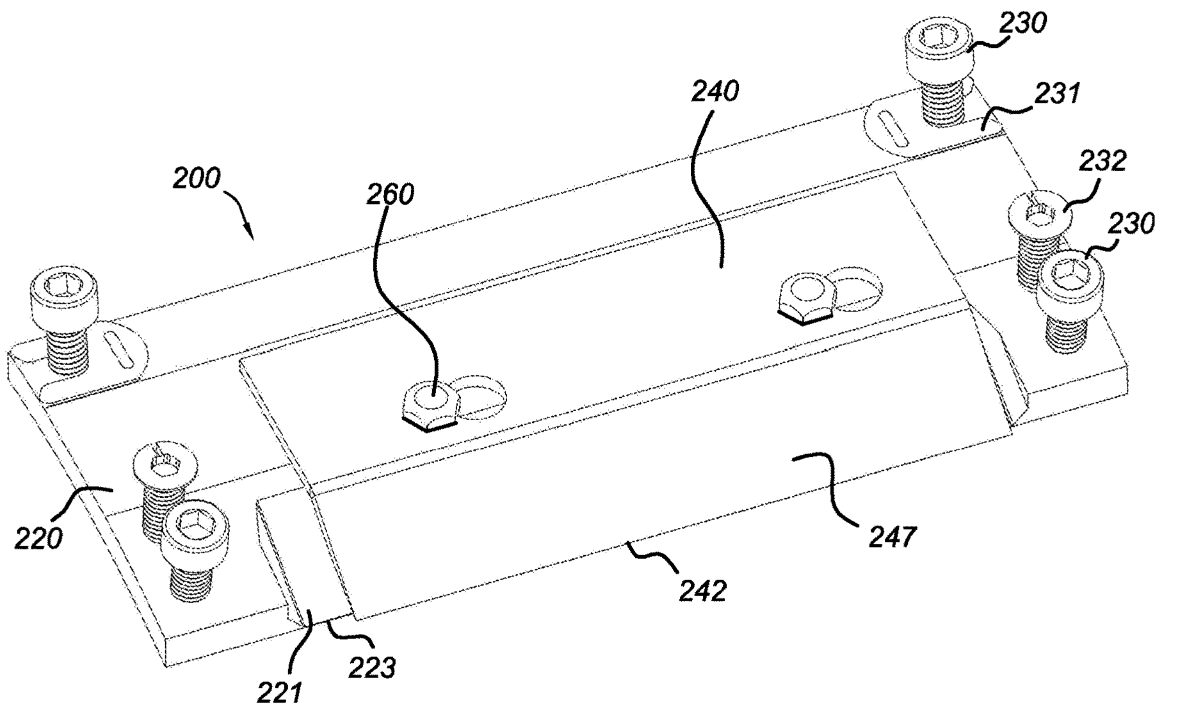
FIG. 13 shows the knife assembly of FIG. 12 with the knife blade removed.
Figure 14:
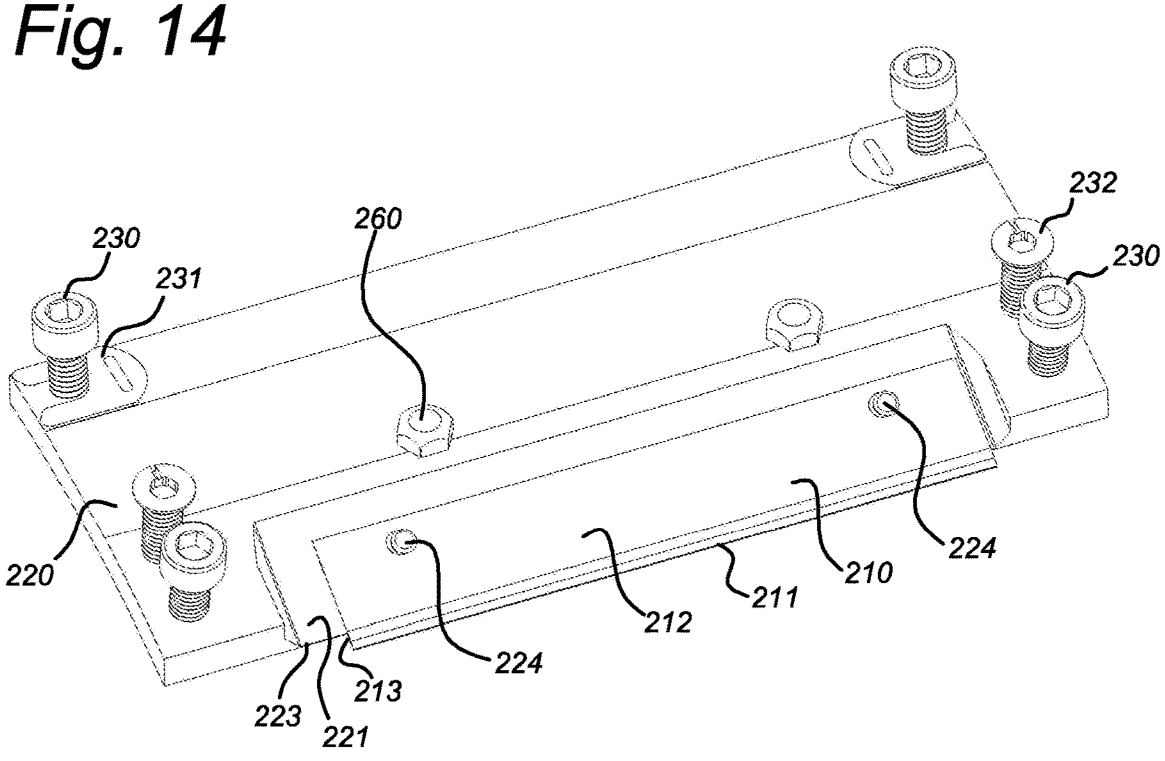
FIG. 14 shows the knife assembly of FIG. 12 with the clamp removed.
Figure 15:
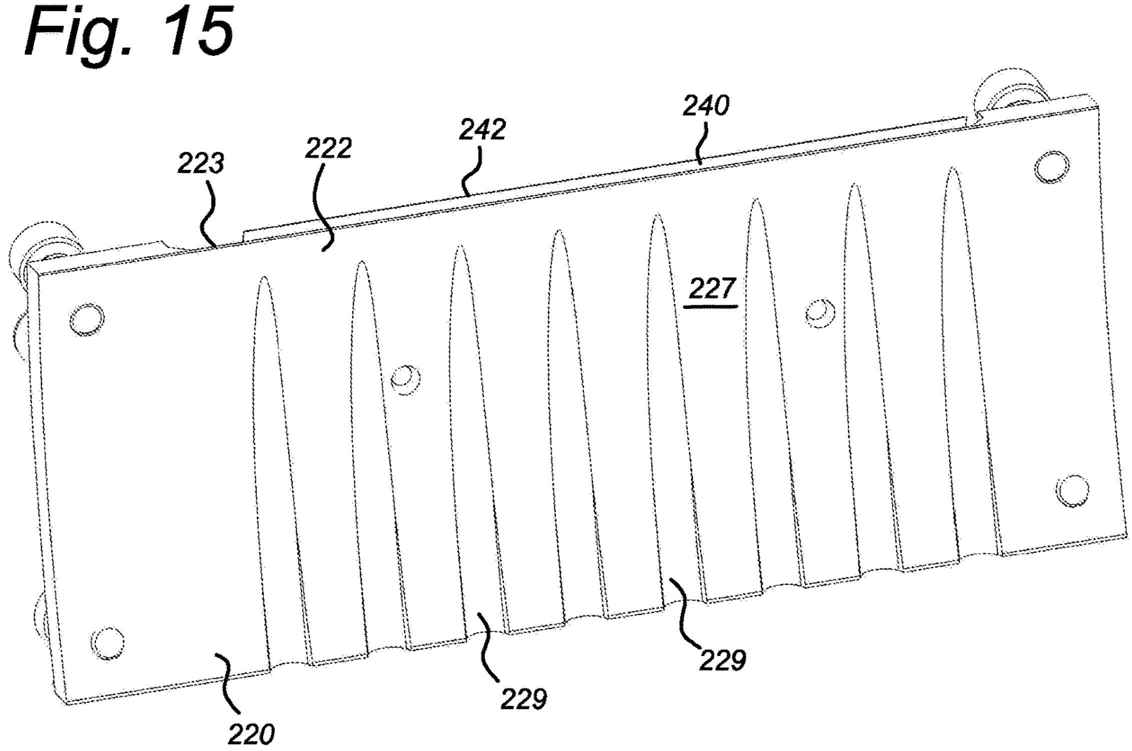
FIG. 15 shows a bottom view of the knife assembly of FIG. 12 with the knife blade removed.
Figure 16:
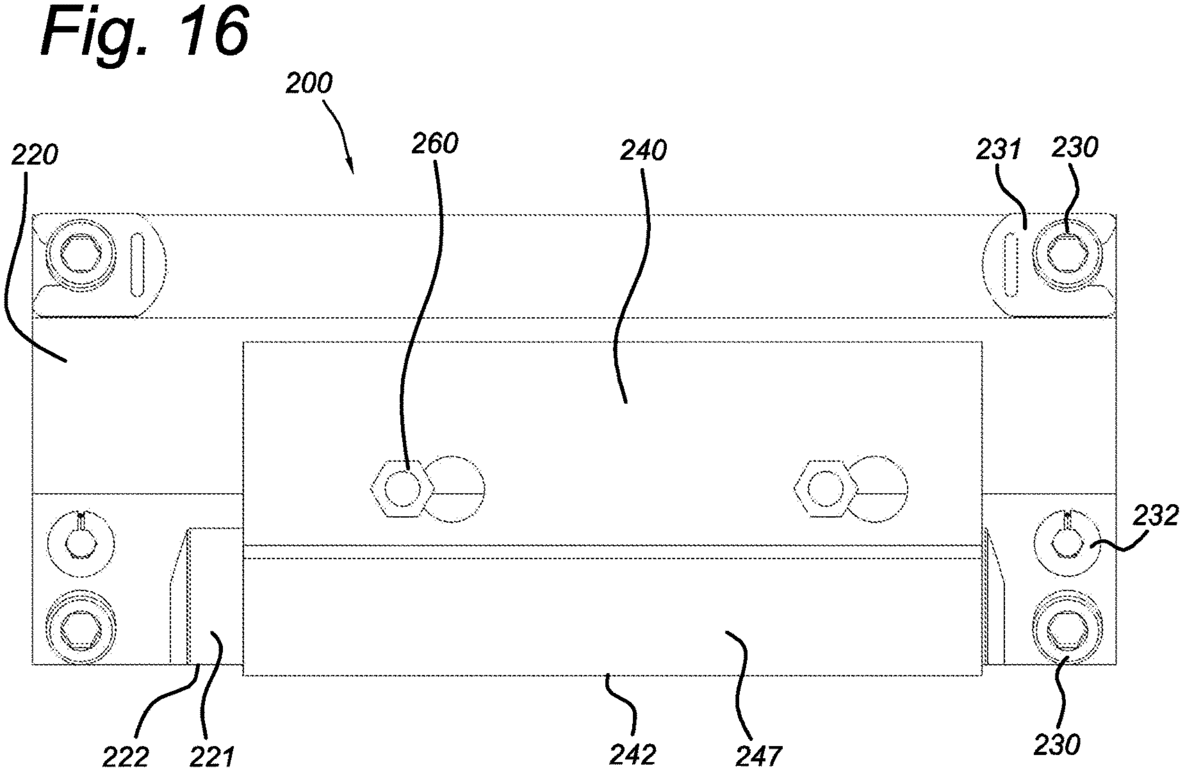
FIG. 16 shows a top view of the knife assembly of FIG. 12 with the knife blade removed.
Figure 17:
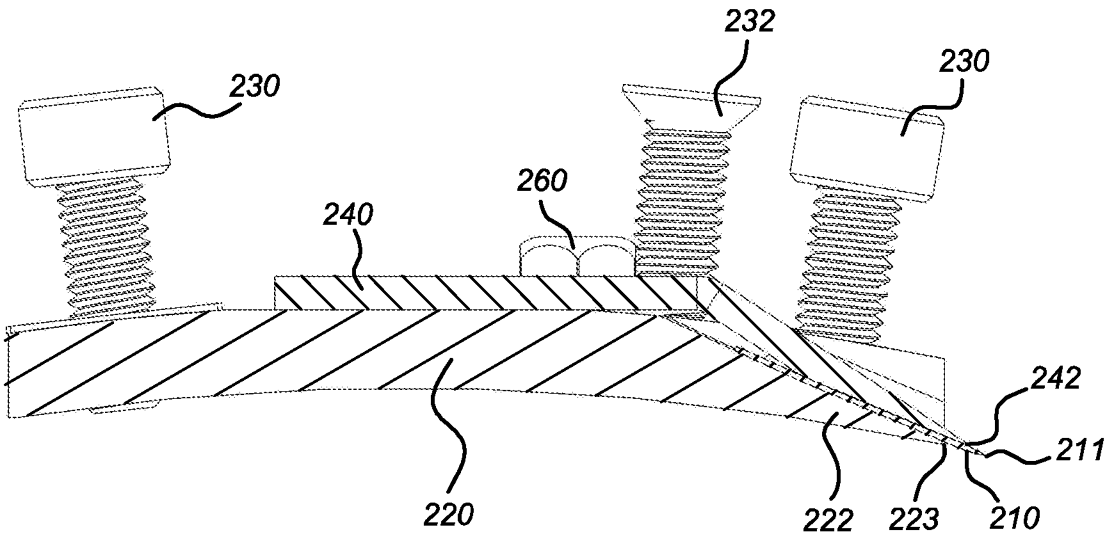
FIG. 17 shows a cross-sectional view of the knife assembly of FIG. 12.
Figure 18:
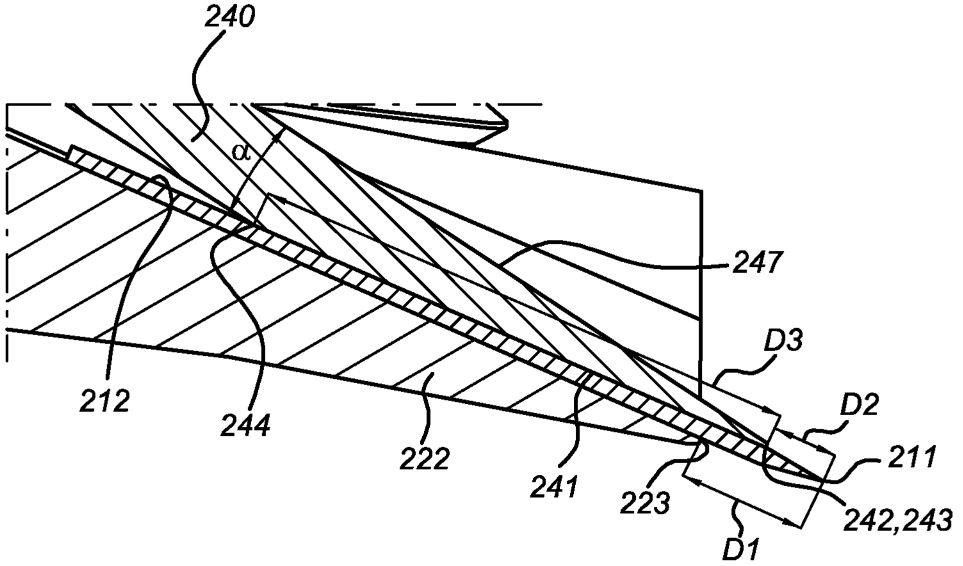
FIG. 18 shows a detail of FIG. 17.
Figure 19:
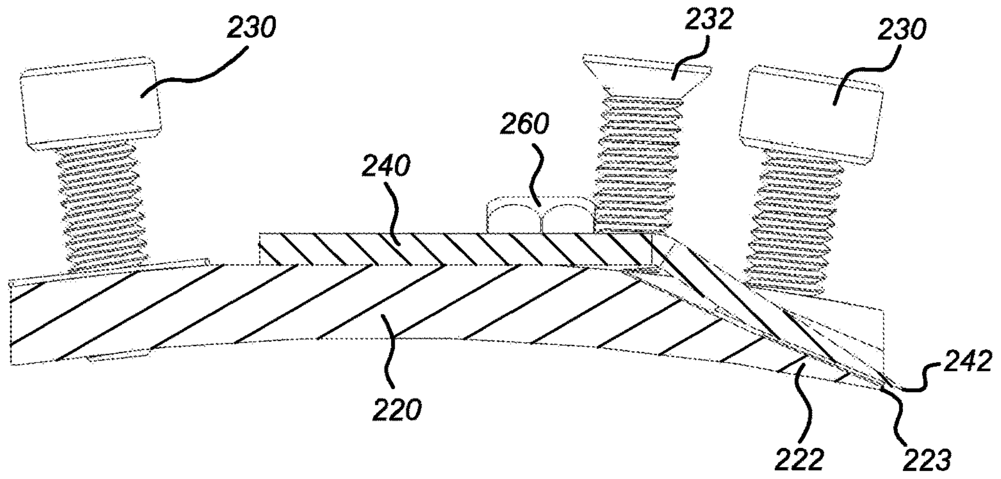
FIG. 19 shows a cross-sectional view of the knife assembly of FIG. 12 with the knife blade removed.

The holder 120, being a wall segment for an annular-shaped cutting head, has a bottom side 127 which, when assembled, forms part of the interior surface of the cutting head, see FIG. 9, along which the product slides between successive cuts. This bottom side 127 or product sliding surface comprises on the one hand corrugations 128 which are continuous between the leading and trailing ends of the wall segment and on the other hand corrugations 129 which gradually flatten out from the leading end towards the trailing end. The continuous corrugations 128 alternate with the other corrugations 129. The latter provide a so-called "sand gate", i.e. space for accommodating small stones or the like which enter the cutting head along with the product and which can exit the cutting head by sliding along these gradually flattening corrugations 129 without hitting the knife blades.

In embodiments, the included angle $\alpha$ between the top surface 146 of the clamp 140 and the top surface 112 of the knife blade is in the range of 6 to 12°. It has been found that by extending the clamp, such that its leading edge or frontal tip is moved forward on the knife assembly, the included angle between the top surface of the clamp and the knife blade can be reduced. This can in turn lead to a reduced "rake-off angle".

A second embodiment of a knife assembly according to the invention will be described with reference to FIGS. 12-22. The knife assembly 200 is likewise for an annular-shaped cutting head. The knife assembly 200 is provided for mounting a flat or planar knife blade 210. The knife assembly 200 comprises a holder 220, which is in this embodiment likewise a wall segment for the cutting head. The holder 220 has a bearing surface 221 which is configured for supporting the knife blade 210. The holder 220 and/or the clamp 240 are provided for defining the position of the knife blade 210 on the holder. In the embodiment shown, this is provided by means of positioning pins 224 (see FIG. 14) on the holder, the knife blade 210 having corresponding holes.

The knife assembly 200 further comprises a clamp 240 which is arranged for clamping the knife blade 210 onto the holder 220, and a fastening mechanism 260, in this embodiment a pair of fastening screws 260, cooperating with the clamp and the holder for securing and clamping the knife blade 210 between the clamp 240 and the holder 220 with the cutting edge 211 of the knife blade 210 protruding at a front side of the knife assembly 200. The holder has a frontal part 222 which is, in clamped state, in contact with a bottom side 213 of the knife blade at a first distance D1 from the cutting edge 211, for example 3.0 to 8.0 mm, preferably 3.0 to 5.0 mm. The clamp 240 has a frontal tip 242 which, in clamped state, clamps onto a top side 212 of the knife blade and is located a second distance D2 from the cutting edge 211, the second distance D2 being smaller than the first distance D1 (see FIG. 18). The second distance D2 is for example 0.1 to 7.5 mm, preferably 0.1 to 4.5 mm.

This is clearly shown in FIGS. 13, 15, 16 and 19 where the knife blade 210 has been removed from between the holder 220 and the clamp 240. The frontal tip 242 of the clamp protrudes from the front edge 223 of the holder 220, so with the knife blade present as in FIGS. 17-18 the frontal tip 242 of the clamp is closer to the cutting edge 211 than the front edge 223 of the holder 220.

The frontal tip 242 of the clamp 240 contacts the knife blade 210 along a first clamping line 243, which is located at the distance D1 from the cutting edge 211. As a result, this first clamping line 243 is generally located between the cutting edge 211 and the (foremost) contact point or line 223 (in this embodiment the front edge) where the frontal part 222 of the holder 220 contacts the knife blade 211.

The holder 220 is the part of the knife assembly which in use faces the inside of the cutting head, i.e. the side from which the product to be cut is fed by means of an impeller (not shown), and the clamp 240 is in use facing the outside of the cutting head, i.e. the side to which cut product is discharged. The holder 220 is a larger and thus generally more expensive part than the clamp 240, which is generally thinner and may be designed to flex to a certain extent upon clamping the knife blade. The holder 220 comprises mounting portions with fixing bolts 230 for mounting the knife assembly 200 to rim structures 233, thereby forming the cutting head. As shown in the figures, gap setting elements 231 are placed at the rear or trailing end of the holder 220 to adjust the position of the trailing end with respect to the rim structure 233, which adjusts the gap or gate opening at the subsequent knife blade and sets the slice thickness. This gap setting system has been described in detail in applicant's co-pending European patent application EP 2 918 384 A1, which is incorporated herein by reference in its entirety.

Near the leading end of the holder 220, set screws 232 are provided to quickly make a fine adjustment of the gap setting. These set screws 232 also extend through the rim structure 233 and act on the outer surface near the front or leading end of the holder/cutting station. Notches are provided in the screw and on the surrounding surface of the rim structure 233 to indicate different setting values.

Extending the length of the clamp 240 such that the frontal tip protrudes beyond the leading edge 223 or frontal part 222 of the holder 220 has several advantages. Firstly, a crumple zone is created in front of the holder 220. This crumple zone is made up of both the knife blade 210 and the clamp 240 and provides resistance to stone penetration in front of the holder 220. Tests have shown that this can reduce or eliminate damage on the holder.

Further, the cross-sectional thickness of the clamp 240 along the frontal part 222, or at least the leading edge 223 of the holder 220 can be increased. This increased cross-sectional thickness means that there is more material opposite the frontal part 222 or leading edge 223, which can result in a stronger holding force on the knife blade 210. Furthermore, the contact surface area between the knife blade 210 and the clamp 240 can also be increased, i.e. the knife blade 210 can be held between larger areas. The protruding parts of the knife clamp 240 past the holder 220 can also provide more precise locating support to the knife blade very near the cutting edge. Tests have shown that this precise support can reduce or eliminate the flex of the knife blade 210 and the risk of a resulting gap underneath the knife blade, i.e. between the knife blade 210 and the holder 220, where small particles like dirt, sand or starch could enter. In absence of such a gap, particles cannot enter between the knife blade and the holder, and it can thus be ensured that the knife blade stays in place over an entire production run.

Still further, the extended clamp 240 can facilitate the replacement of the knife blades 210 on the assembled cutting head. In particular, the knife blades 210 can be removed or replaced without having to completely remove the clamps. Because the clamp 240 extends past the holder 220 it is possible to loosen the fastening mechanism 260 and lift the clamp 240 to remove a knife blade and install a new knife blade while the clamp remains in place, by sliding in the new knife blade from the inside of the cutting head (see FIGS. 20-21). This can thus reduce knife blade changing time.

In the embodiment shown, the clamp 240 clamps the knife blade 210 by means of the frontal tip 242 along the first clamping line 243 and by means of a clamping surface 241 which extends rearward from the first clamping line 243 up to a second clamping line 244, which is a predetermined distance D3 rearward from the first clamping line (see FIG. 18), for example at least 2.0 mm, preferably 8.0 to 14.0 mm, more preferably 11.0 to 13.0 mm. In other words, the clamping lines 243 and 244 are boundaries of a clamping surface 241 which is fully in contact with the knife blade 210 in clamped state. The second clamping line 244 is preferably located rearward from the frontal edge 223, i.e. the foremost location of contact between the frontal part 222 of the holder and the bottom side 213 of the knife blade 210. This provides a large clamping area, as a result whereof clamping action can be enhanced due to a stronger and/or more distributed clamping force.

In alternative embodiments, the clamp 240 may contact the knife blade 210 only at the frontal tip 242 in clamped state, or at the frontal tip 242 and one or more second clamping portions rearward and spaced from the frontal tip 242, for example along a second clamping line 244. In other words, it is not essential that the clamp 240 touches on the knife blade 210 with a full clamping surface 241.

In the embodiment shown, the holder 220 and clamp 240 have complementary shaped surfaces, namely bearing surface 221 which is slightly concave and clamping surface 241 which is slightly convex, such that in clamped state both the holder and the clamp have a surface contact with the knife blade and slightly bend the knife blade, which straightens the cutting edge 211.

Figure 20:
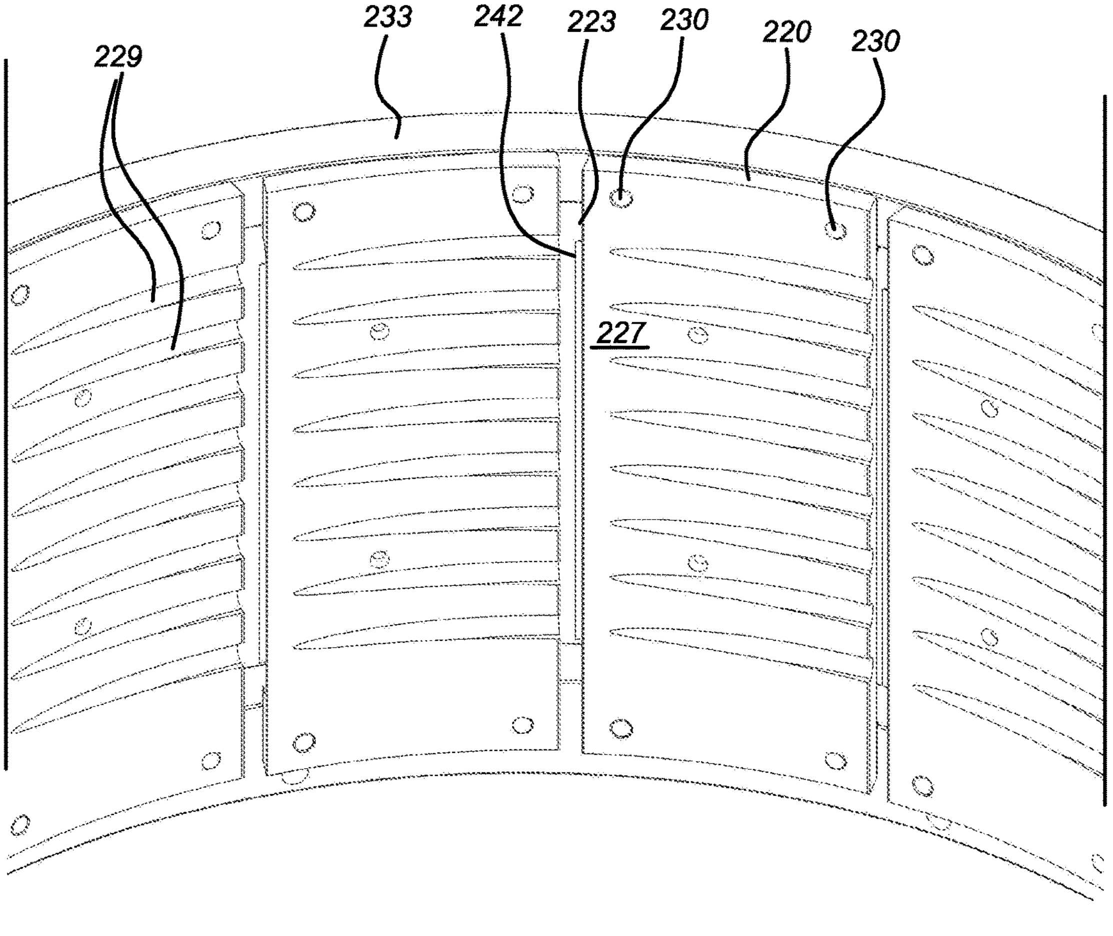
FIGS. 20 and 21 show perspective views of a cutting head comprising a plurality of knife assemblies according to FIG. 12, with the knife blades removed.
Figure 21:
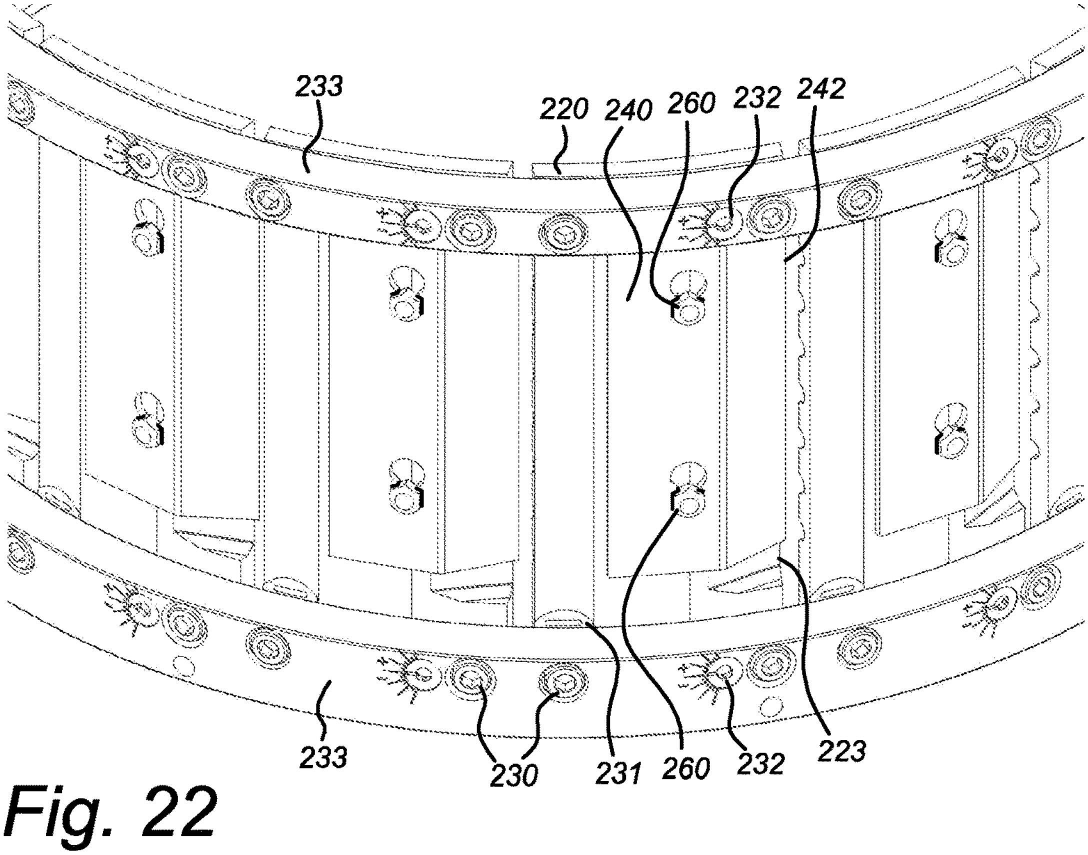
Figure 22:
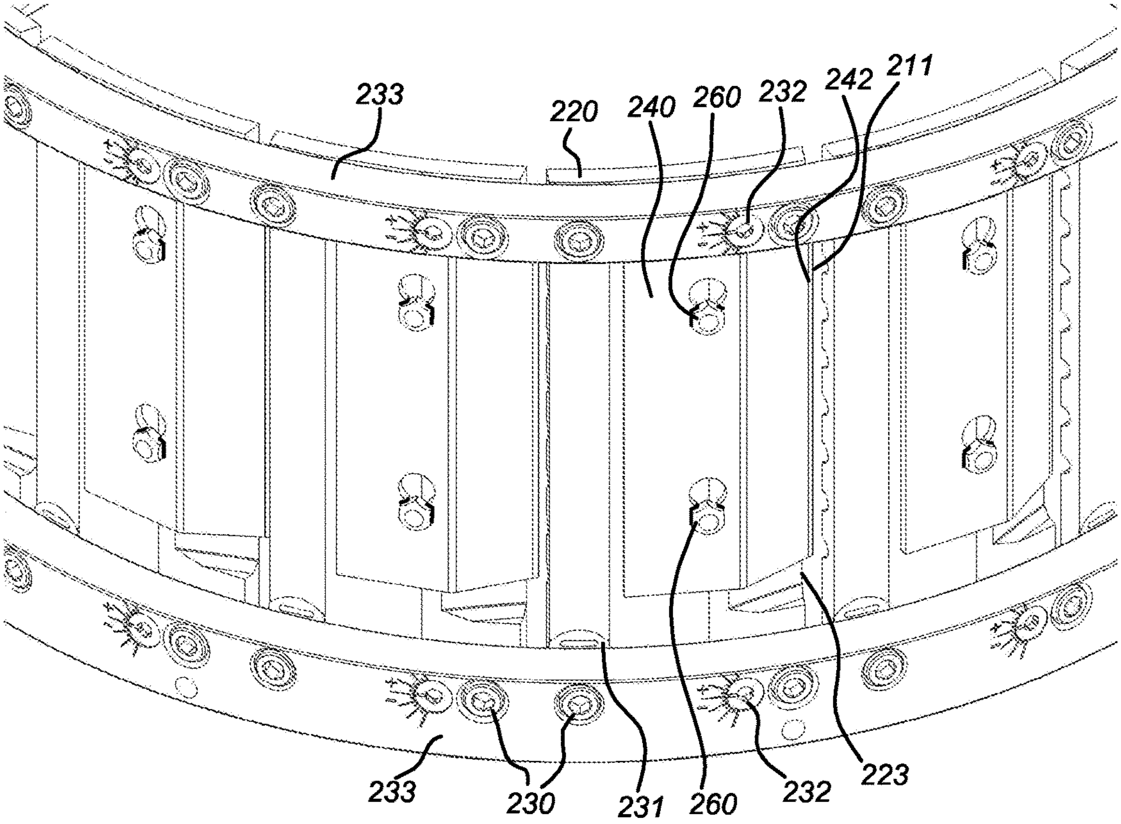
FIG. 22 shows a perspective view of the cutting head of FIGS. 20-21 with the knife blades installed.

The holder 220, being a wall segment for an annular-shaped cutting head, has a bottom side 227 which, when assembled, forms part of the interior surface of the cutting head, see FIG. 20, along which the product slides between successive cuts. This bottom side 227 or product sliding surface may comprise recesses 229 to provide a sand gate.

In embodiments, the included angle between the top surface 247 of the clamp and the top surface 212 of the knife blade 210 is in the range of 6 to 12°. It has been found that by extending the clamp, such that its leading edge or frontal tip is moved forward on the knife assembly, the included angle between the top surface of the clamp and the knife blade can be reduced. This can in turn lead to a reduced "rake-off angle".

Figure 23:
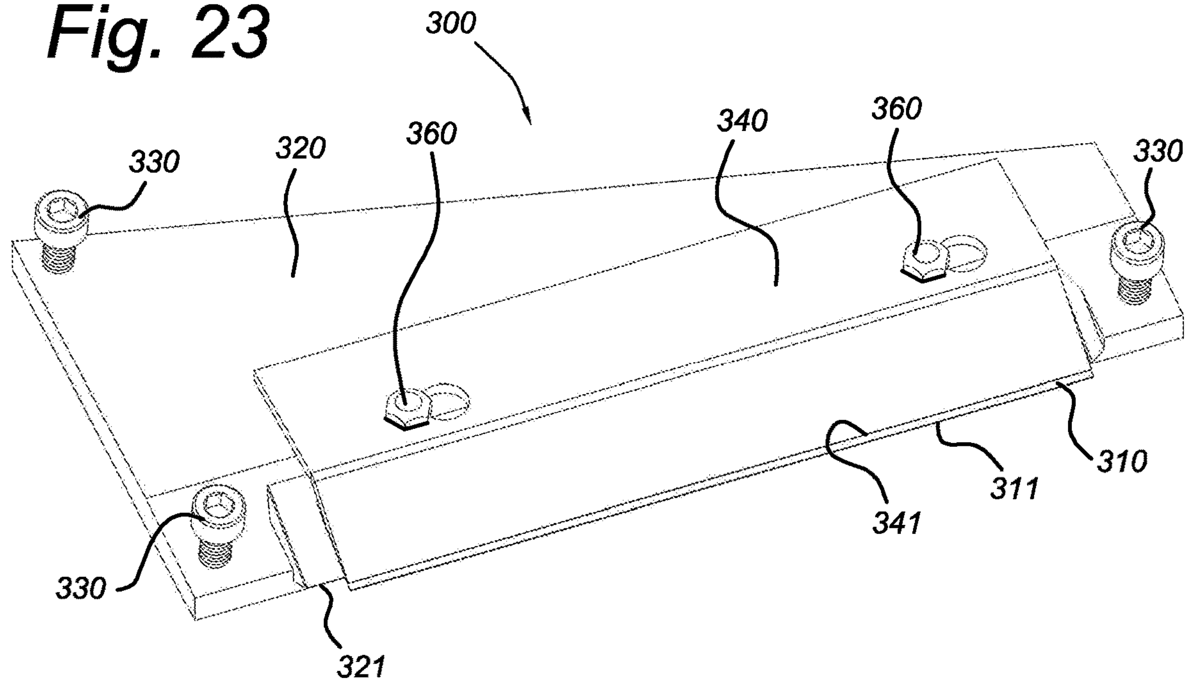
FIG. 23 shows a perspective view of a third embodiment of a knife assembly according to the invention.

FIG. 23 shows a third embodiment of a knife assembly 300 according to the invention, which is for a cutting apparatus of the cutting wheel type, as for example described in U.S. Pat. No. 7,178,440. The knife assembly 300 is provided for mounting a flat or planar knife blade 310. The knife assembly 300 comprises a holder 320, which is in this embodiment provided for being fixed between a hub and a rim of the cutting wheel (not shown). To this end, the holder 320 comprises mounting portions with fixing bolts 330 for mounting the knife assembly 300 to the hub and the rim. The knife assembly 300 further comprises a knife blade 310, a clamp 340 which is arranged for clamping the knife blade 310 onto the holder 320, and a fastening mechanism 360, in this embodiment a pair of fastening screws 360. The fastening screws cooperate with the clamp and the holder for securing and clamping the knife blade 310 between the clamp 340 and the holder 320 with the cutting edge 311 of the knife blade 310 protruding at a front side of the knife assembly 300. The clamp 340 of the knife assembly 300 is likewise extended such that the tip 341 of the clamp is located in front of the leading end 321 of the holder 320.

The knife assembly 300, other than being for a cutting wheel instead of a cutting head, is further the same as or similar to the knife assembly 200.

In alternative embodiments, knife assemblies according to the invention may be the same as or similar to the knife assembly 100, except for being configured for mounting to a cutting wheel instead of a cutting head.

In alternative embodiments, knife assemblies according to the invention may be the same as or similar to the knife assemblies 100 or 200, except for being configured for mounting a different type of cutting apparatus.

In further alternative embodiments, knife assemblies according to the invention may be similar to the knife assembly 100, i.e. for clamping corrugated knife blades, with the difference that clamp 140 has fingers 145 of different lengths. A clamp according to such an embodiment may for example have a first set of fingers of which the frontal tip is located in front of the front edge 123 of the holder 120 (in the same way as shown in FIGS. 1-11) and a second set of fingers which are shorter and of which the frontal tip is located behind or rearward from the front edge 123 of the holder. The first set may for example alternate with the second set. The first set of fingers may clamp onto the knife blade 110 along a first clamping line and the second set of fingers may clamp onto the knife blade 110 along a second clamping line, which may be located rearward from the front edge 123 of the holder. The first set of fingers and/or the second set of fingers may further be provided for clamping the knife by means of clamping surfaces, e.g. with a length of at least 2.0 mm as described elsewhere herein.

In further alternative embodiments, knife assemblies according to the invention may be similar to the knife assembly 200, i.e. for clamping flat or planar knife blades, with the difference that the top surface 247 of the clamp 140 is not a planar surface like in the embodiment shown in FIGS. 12-22 (with the front edge 242 being a straight line), but a non-planar surface. A clamp according to such an embodiment may for example have a convex or concave top surface, with the front edge then being correspondingly curved, with for example only part of the curved front edge being located in front of the edge 223 of the holder (e.g. a middle part in case of a convex front edge and side parts in case of a concave front edge) and another part of the curved front edge being located behind the front edge 223 of the holder (e.g. side parts in case of a convex front edge and a middle part in case of a concave front edge). Another example of a clamp according to such an embodiment may for example have a wide V-shaped profile with two planar surfaces at an obtuse angle with respect to each other and a front edge with two straight parts intersecting each other in the middle, wherein for example the middle part of the front edge is located in front of the front edge 223 of the holder and side parts of the front edge are located behind or rearward from the front edge 223 of the holder.

In general, in knife assemblies according to embodiments of the invention, the clamp may have at least one clamping part of which a frontal tip, in clamped state, clamps onto a top side of the knife blade at a location which is spaced the second distance D2 from the cutting edge 111, 211, the second distance D2 being smaller than the first distance D1 between the front edge 123, 223 of the holder and the cutting edge 111, 211.

The invention claimed is:

1. A knife assembly comprising:

a knife blade of which a front edge is a cutting edge, wherein the knife blade is corrugated with peaks and valleys;

a holder configured for supporting the knife blade, wherein the holder comprises a bearing surface with peaks and valleys corresponding to the peaks and valleys of the knife blade;

a clamp arranged for clamping the knife blade onto the holder, wherein the holder and the clamp have complementary shaped surfaces such that in clamped state both the holder and the clamp have a surface contact with the knife blade along the entire width of the knife blade; and a fastening mechanism cooperating with the clamp and the holder for securing and clamping the knife blade between the clamp and the holder with the cutting edge protruding at a front side of the knife assembly;

wherein the holder comprises a frontal part or portion which is the foremost part or portion of the knife assembly at a bottom side of the knife blade, and of which a foremost contact point is, in clamped state, in contact with the bottom side of the knife blade at a first distance from the cutting edge, wherein a leading portion of the knife blade protrudes forward with respect to said foremost contact point of the holder with the bottom side of the knife blade, wherein the clamp comprises front portions which protrude forward and into the valleys of the knife blade and which fully engage the valleys of the knife blade, wherein the front portions have leading edges that protrude forward with respect to said foremost contact point, and wherein said leading portion of the knife blade and said leading edges of the clamp create a crumple zone in front of the holder.

2. The knife assembly according to claim 1, wherein the front portions of the clamp have bottom sides which, in clamped state, engage the respective valleys of the knife blade from said leading edges at a second distance from the cutting edge up to a third distance from the cutting edge, the second distance being smaller than the first distance and the third distance being greater than the first distance.

3. The knife assembly according to claim 2, wherein the second distance is 0.1 to 7.5 mm.

4. The knife assembly according to claim 1, wherein, in clamped state, the leading edges of the front portions of the clamp contact the top sides of the valleys of the knife blade along a first clamping line, said first clamping line being located at a second distance from the cutting edge which is smaller than the first distance, and the frontal part or portion of the holder contacts the bottom side of the knife blade along at least a frontal contact line, said frontal contact line being located at said first distance from the cutting edge.

5. The knife assembly according to claim 4, wherein the clamp is provided for, in clamped state, clamping the valleys of the knife blade by means of second clamping portions along a second clamping line, said second clamping line being located at a third distance from the cutting edge which is greater than the first distance.

6. The knife assembly according to claim 1, wherein the length of the clamping surface, measured in rearward direction from the leading edge of the clamp, is at least 2.0 mm.

7. The knife assembly according to claim 1, wherein the clamp has a top surface extending rearward from said leading edge which, in clamped state, forms an angle of 6 to 12° degrees with said knife blade.

8. The knife assembly according to claim 1, wherein the first distance is 3.0 to 8.0 mm.

9. An annular-shaped cutting head comprising at least one rim structure and a plurality of knife assemblies according to claim 1 assembled onto said at least one rim structure.

10. A centrifugal cutting apparatus comprising a cutting head according to claim 9.

11. A cutting wheel comprising a hub, a rim and a plurality of knife assemblies according to claim 1 assembled between said hub and said rim.

12. A cutting apparatus comprising a cutting wheel according to claim 11.

13. A centrifugal cutting apparatus comprising an annular-shaped cutting head comprising at least one rim structure and a plurality of knife assemblies assembled onto said at least one rim structure, wherein the cutting head is configured for cutting corrugated slices with a substantially uniform slice thickness and wherein each knife assembly comprises a knife blade of which a front edge is a cutting edge, wherein the knife blade is corrugated with peaks and valleys;

a holder configured for supporting the knife blade, wherein the holder comprises a bearing surface with peaks and valleys corresponding to the peaks and valleys of the knife blade;

a clamp arranged for clamping the knife blade onto the holder, wherein the holder and the clamp have complementary shaped surfaces such that in clamped state both the holder and the clamp have a surface contact with the knife blade along the entire width of the knife blade; and a fastening mechanism cooperating with the clamp and the holder for securing and clamping the knife blade between the clamp and the holder with the cutting edge protruding at a front side of the knife assembly;

wherein the holder comprises a frontal part or portion which is the foremost part or portion of the knife assembly at a bottom side of the knife blade, and of which a foremost contact point is, in clamped state, in contact with the bottom side of the knife blade at a first distance from the cutting edge, and wherein a leading portion of the knife blade protrudes forward with respect to said foremost contact point of the holder with the bottom side of the knife blade, wherein the clamp comprises front portions which protrude forward and into the valleys of the knife blade and which fully engage the valleys of the knife blade, wherein the front portions have leading edges that protrude forward from said foremost contact point up to a second distance from the cutting edge, the second distance being smaller than the first distance.

14. The centrifugal cutting apparatus according to claim 13, wherein the leading portion of the knife blade and the front portions of the clamp create a crumple zone in front of the holder.

15. The centrifugal cutting apparatus according to claim 13, wherein the front portions of the clamp have bottom sides which, in clamped state, engage the respective valleys of the knife blade from said leading edges at said second distance from the cutting edge up to a third distance from the cutting edge, the third distance being greater than the first distance.

16. The centrifugal cutting apparatus according to claim 13, wherein the length of the clamping surface, measured in rearward direction from the leading edge of the clamp, is at least 2.0 mm.

17. The centrifugal cutting apparatus according to claim 13, wherein the clamp has a top surface extending rearward from said leading edge which, in clamped state, forms an angle of 6 to 12° degrees with said knife blade.

18. The centrifugal cutting apparatus according to claim 13, wherein the first distance is 3.0 to 8.0 mm and wherein the second distance is 0.1 to 7.5 mm.

19. The centrifugal cutting apparatus according to claim 13, wherein each holder is a wall segment of the annular-shaped cutting head and has a bottom side that forms a product sliding surface along which the product slides between successive cuts, wherein the product sliding surface comprises first corrugations which are continuous between the leading and trailing ends of the wall segment.

20. The centrifugal cutting apparatus according to claim 13, wherein the product sliding surface comprises second corrugations which gradually flatten out from the leading end towards the trailing end of the wall segment.

* * * * *